United States Patent
Sugiyama

(10) Patent No.: US 8,964,326 B1
(45) Date of Patent: Feb. 24, 2015

(54) DISK STORAGE APPARATUS AND METHOD FOR REGULATING HEAD FLYING HEIGHT BEFORE SEEK OPERATION

(71) Applicant: Kabushiki Kaisha Toshiba, Minato-ku (JP)

(72) Inventor: Hiroshi Sugiyama, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/168,148

(22) Filed: Jan. 30, 2014

Related U.S. Application Data

(60) Provisional application No. 61/910,724, filed on Dec. 2, 2013.

(51) Int. Cl.
  *G11B 5/596* (2006.01)
  *G11B 21/02* (2006.01)
  *G11B 27/36* (2006.01)

(52) U.S. Cl.
  USPC .............................. 360/78.04; 360/75; 360/31

(58) Field of Classification Search
  None
  See application file for complete search history.

(56) References Cited

U.S. PATENT DOCUMENTS

| | | | |
|---|---|---|---|
| 7,088,545 B1 | 8/2006 | Singh et al. | |
| 7,236,330 B2 * | 6/2007 | Suk | 360/245.7 |
| 7,375,914 B1 | 5/2008 | Dieron et al. | |
| 7,385,777 B2 * | 6/2008 | Satoh et al. | 360/75 |
| 7,457,069 B2 | 11/2008 | Yoshioka et al. | |
| 2009/0067095 A1 * | 3/2009 | Mak et al. | 360/235.5 |

* cited by examiner

*Primary Examiner* — Andrew L Sniezek
(74) *Attorney, Agent, or Firm* — Oblon, Spivak, McClelland, Maier & Neustadt, L.L.P.

(57) ABSTRACT

According to one embodiment, a first slider of a disk storage apparatus includes a first head and flies over a first recording surface of a first disk. A heater element in the first head projects the first head toward the first recording surface of the first disk depending on heater power. A controller of the apparatus reduces a value for the heater power from a first value to a second value before performing a seek operation of moving the first head such that the first head moves across a concentric circular area including a protrusion on the first recording surface. The controller measures a wait time needed for a flying height of the first head to increase to a first flying height in response to the reduction and starts the seek operation after the wait time elapses.

14 Claims, 6 Drawing Sheets

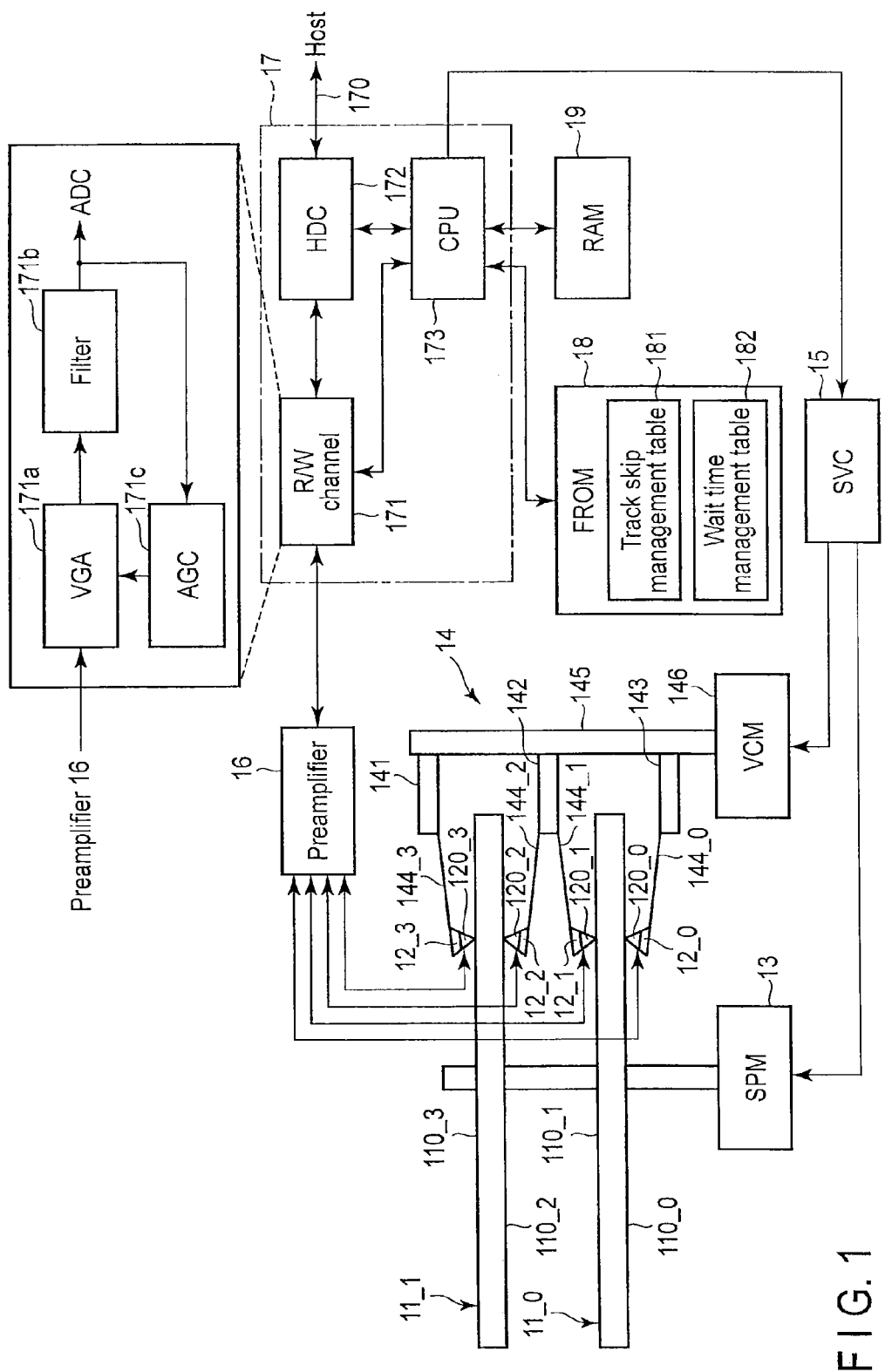
F I G. 1

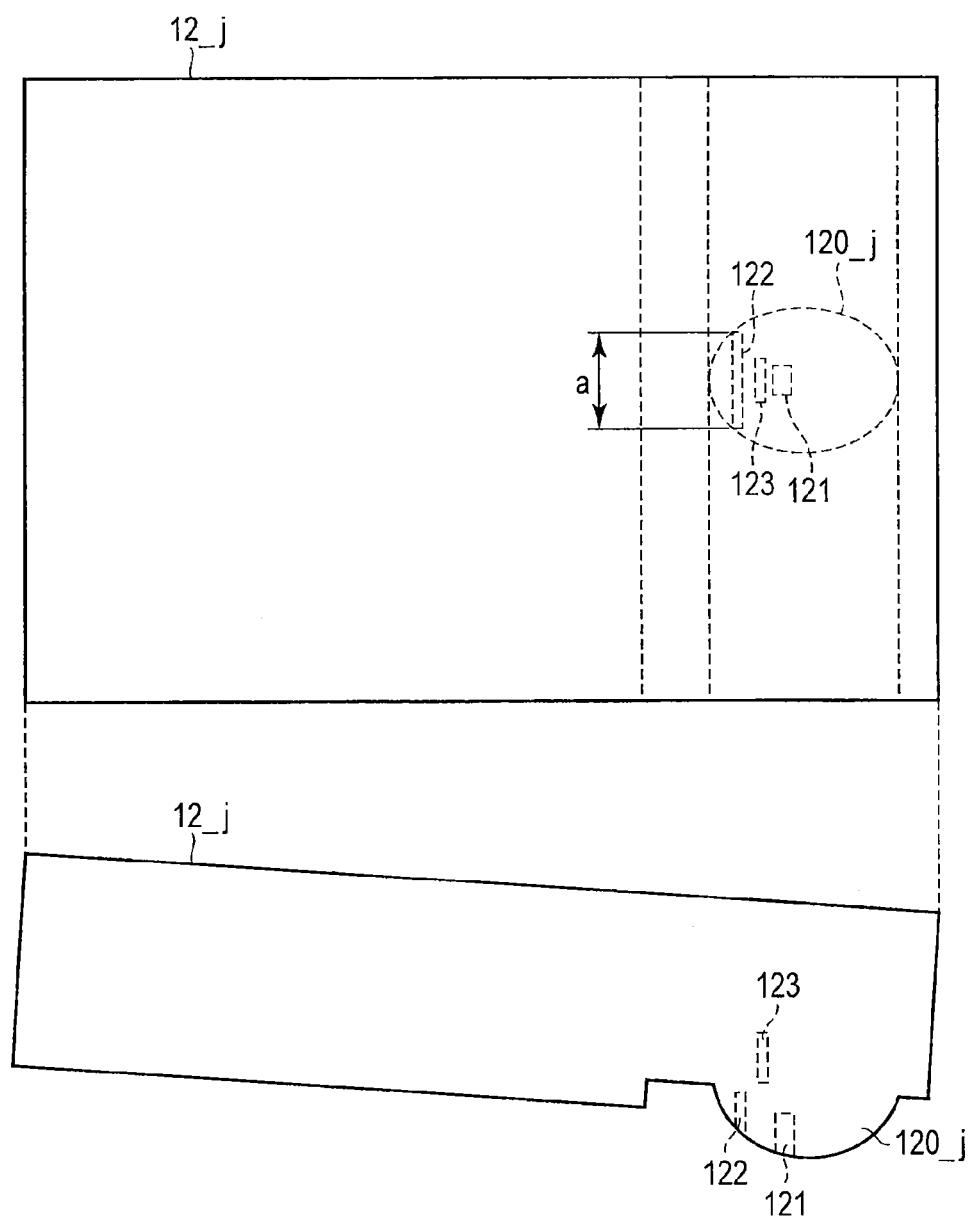
F I G. 2

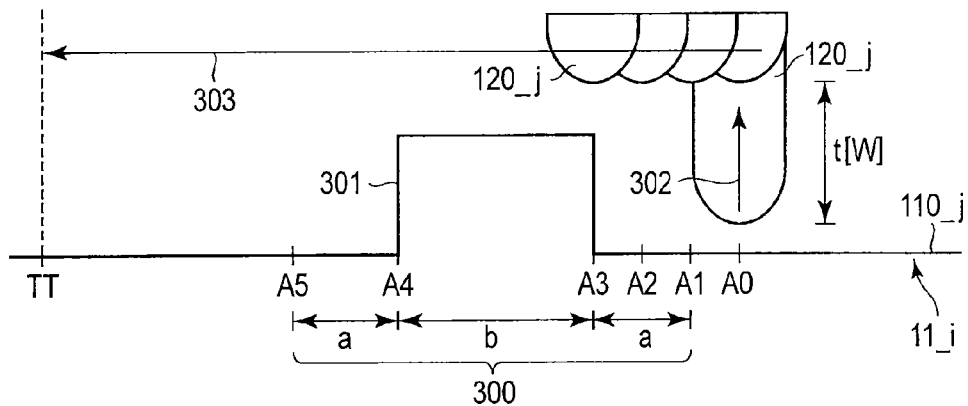
F I G. 3 A
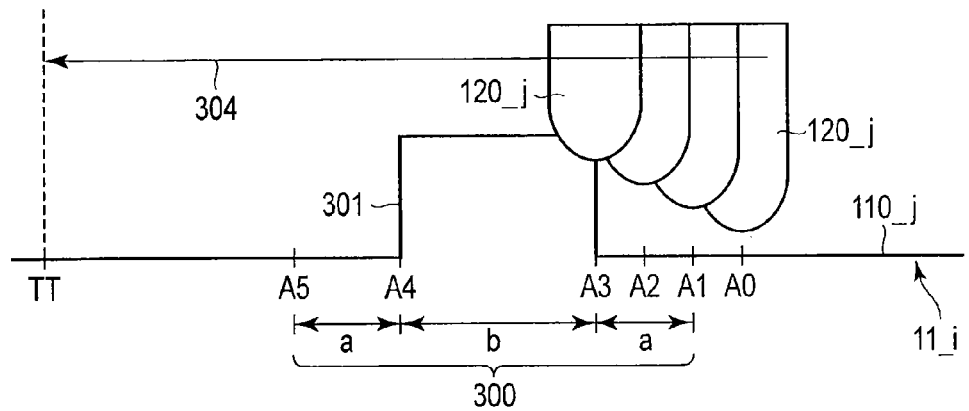
F I G. 3 B
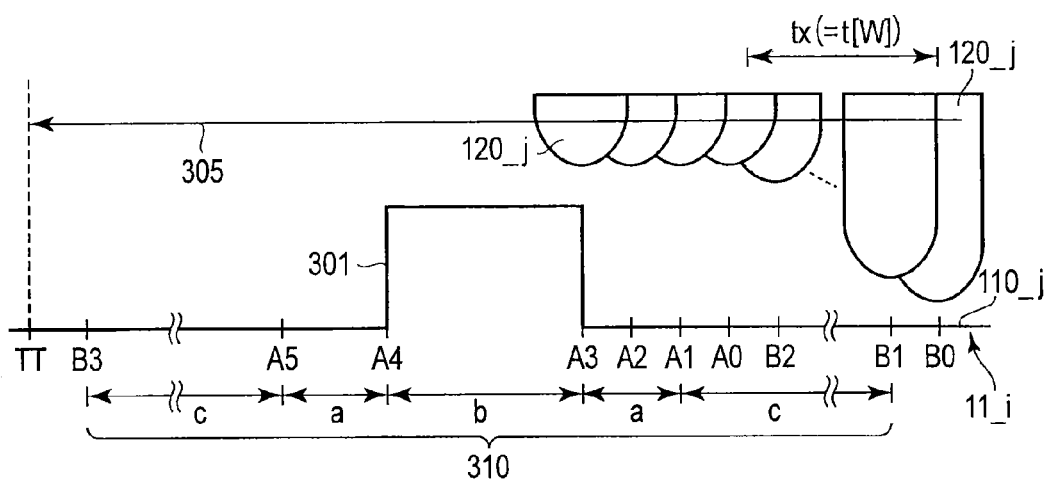
F I G. 3 C

| | | | Head numbers | | | |
|---|---|---|---|---|---|---|
| | | | 0 | 1 | 2 | 3 |
| Temperature range P | Zone numbers | 0 | W | W | W | W |
| | | 1 | W | W | W | W |
| | | ⋮ | ... | ... | ... | ... |
| | | | ... | ... | ... | ... |
| | | | ... | ... | ... | ... |
| | | m | W | W | W | W |
| Temperature range Q | Zone numbers | 0 | W | W | W | W |
| | | 1 | W | W | W | W |
| | | ⋮ | ... | ... | ... | ... |
| | | | ... | ... | ... | ... |
| | | | ... | ... | ... | ... |
| | | m | W | W | W | W |
| Temperature range R | Zone numbers | 0 | W | W | W | W |
| | | 1 | W | W | W | W |
| | | ⋮ | ... | ... | ... | ... |
| | | | ... | ... | ... | ... |
| | | | ... | ... | ... | ... |
| | | m | W | W | W | W |

182

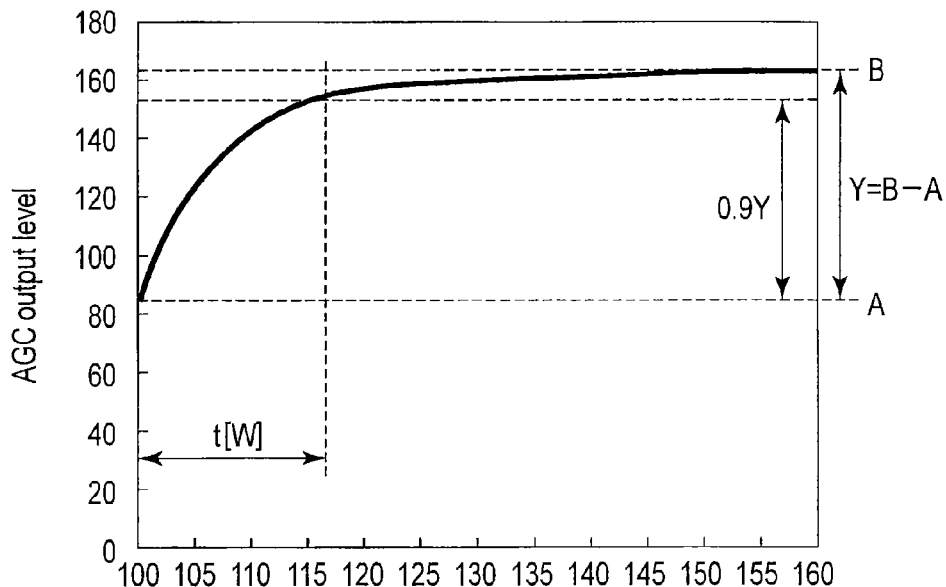
F I G. 6
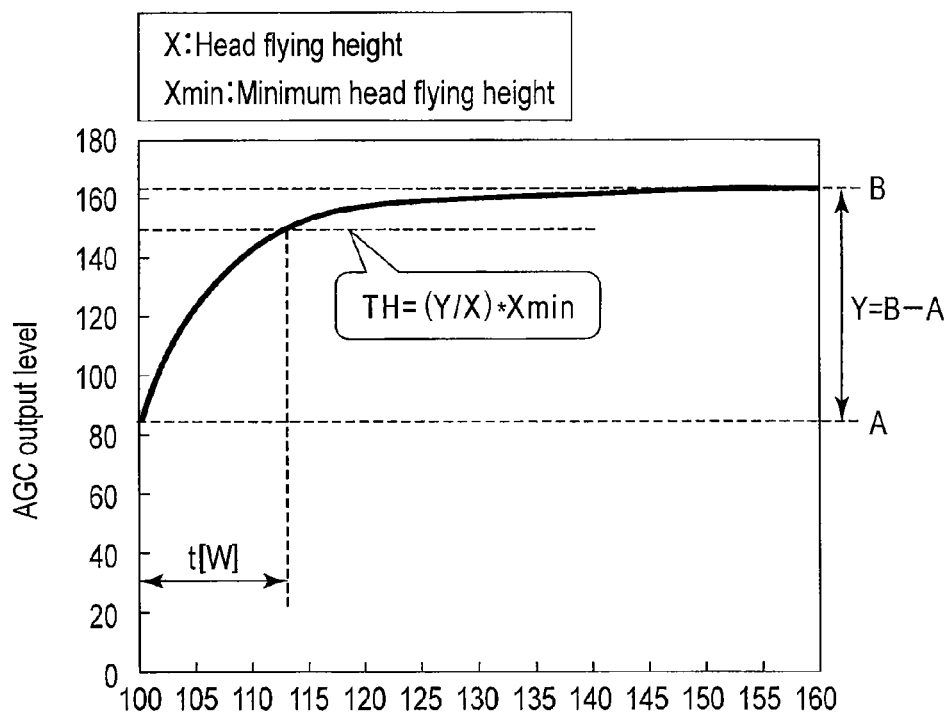
F I G. 7

DISK STORAGE APPARATUS AND METHOD FOR REGULATING HEAD FLYING HEIGHT BEFORE SEEK OPERATION

CROSS-REFERENCE TO RELATED APPLICATIONS

This application claims the benefit of U.S. Provisional Application No. 61/910,724, filed Dec. 2, 2013, the entire contents of which are incorporated herein by reference.

FIELD

Embodiments described herein relate generally to a disk storage apparatus and a method for regulating a head flying height before a seek operation.

BACKGROUND

In recent years, disk storage apparatuses have exhibited dramatically increased recording densities. Hard disk drives (HDDs) are known as typical disk storage apparatuses. For increased recording density on the magnetic disk of the HDD, a magnetic head must be positioned as close to the surface of the magnetic disk (magnetic disk medium) as possible to the extent that the magnetic head does not contact with the magnetic disk. That is, it is necessary to reduce as much as possible the distance (spacing) between the magnetic head (hereinafter referred to as the head) and the magnetic disk (hereinafter referred to as the disk). Such spacing is also referred to as the head flying height.

To regulate the head flying height, a heater element is provided in the head. When predetermined power (heater power) is supplied to the heater element, the heater element produces heat and thus thermally deforms (expands) the head. The thermal deformation causes the head to project toward the surface of the disk and thus sets the head flying height to a target value.

However, a reduced head flying height increases the probability that the head (more specifically, a write element and a read element provided in the head) will contact (collide) with a very small protrusion (that is, a protruding defect) on the disk. Such contact may degrade the characteristics of the write and read elements.

Thus, the conventional technique determines a concentric circular area (that is, a track range) including a protrusion-like defect on the disk and a peripheral area thereof to be a non-use area (hereinafter referred to as a track skip area) that is not used to store data. No tracks within the track skip area are used for writing or reading; these tracks are skipped. According to the conventional technique, when, in a seek operation of moving the head from the current position to a target track, the head needs to be moved in a direction across the track skip area, the heater element is turned off. This avoids thermal deformation of the head. In this case, a projecting state of the head is expected to be released to avoid a possible contact between the head and the protrusion.

However, a certain time is needed to completely release the projecting state of the head. Thus, if the track skip area fails to be set to include an extra space, the head may reach the protrusion before the projecting state of the head is released in response to turn-off of the heater element. In such a case, the head contacts (collides) with the protrusion. On the other hand, if the track skip area is set to include an extra space, such contact as described above can be avoided. However, this setting reduces the format efficiency of the disk.

BRIEF DESCRIPTION OF THE DRAWINGS

FIG. 1 is a block diagram showing an exemplary configuration of a hard disk drive according to an embodiment;

FIG. 2 is a schematic plan view and a schematic side view of a slider flying over a recording surface of a disk shown in FIG. 1;

FIG. 3A is a schematic diagram illustrating a first method for regulating a flying height which method is applied in the embodiment;

FIG. 3B is a schematic diagram illustrating a second method for regulating the flying height which method is used for comparison with the first method for regulating the flying height;

FIG. 3C is a schematic diagram illustrating a third method for regulating the flying height which method is used for comparison with the first method for regulating the flying height;

FIG. 6 is a diagram illustrating a first process of determining a wait time which process is applied in the embodiment;

FIG. 7 is a diagram illustrating a second process of determining the wait time which process is applied in a modification of the embodiment.

DETAILED DESCRIPTION

Figures 4, 5:
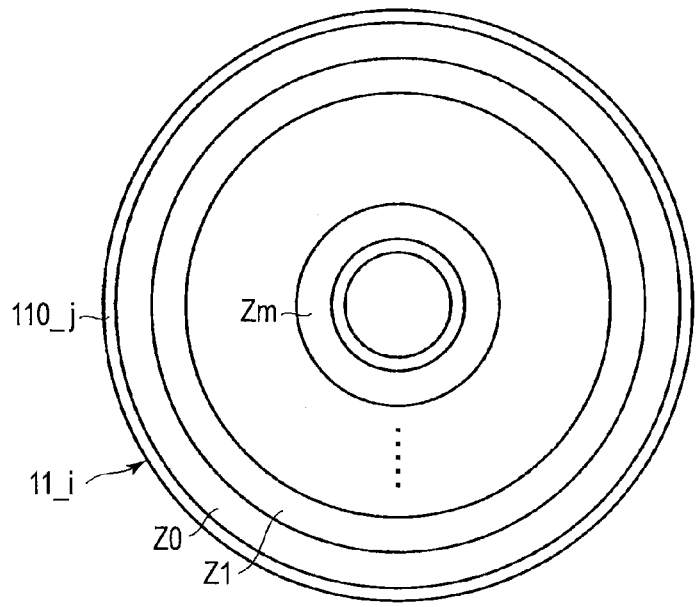
FIG. 4 is a diagram showing an example of a disk format applied in the embodiment.
FIG. 5 is a diagram showing an example of a data structure in a wait time management table applied in the embodiment.

Various embodiments will be described hereinafter with reference to the accompanying drawings.

In general, according to one embodiment, a disk storage apparatus comprises a first slider and a controller. The first slider is configured to fly over a first recording surface of a first disk, and comprises a first head comprising a write element, a read element, and a heater element. The heater element is configured to project the first head toward the first recording surface of the first disk by thermally deforming the first head depending on heater power supplied to the heater element. The controller is configured to reduce a value for the heater power from a first value to a second value before performing a seek operation of moving the first head from a first track to a second track such that the first head moves across a concentric circular area including a protrusion on the first recording surface, to measure a wait time needed for a flying height of the first head to increase to a first flying height in response to the reduction in the heater power, and to start the seek operation after the wait time elapses.

FIG. 1 is a block diagram showing an exemplary configuration of a hard disk drive (HDD) according to an embodiment. HDDs are known as typical disk storage apparatuses and also referred to as magnetic disk drives. The HDD according to the embodiment (more specifically, an HDD 172 in the HDD) is connected to a host apparatus (hereinafter referred to as a host) via a host interface (storage interface) 170. The host utilizes the HDD as a storage device for the host. The host and the HDD are provided in an electronic apparatus such as a personal computer, a video camera, a music player, a mobile terminal, a cellular phone, or a printer device.

The HDD comprises one or more disks (magnetic disks), for example, two disks 11_0 and 11_1, two or more sliders (head sliders), for example, four sliders 12_0 to 12_3, a spindle motor (SPM) 13, and an actuator 14.

Disks 11_0 and 11_1 are magnetic recording media arranged at a given distance between the media. A lower surface (that is, a lower disk surface) and an upper surface (that is, an upper disk surface) of disk 11_0 provide recording surfaces 110_0 and 110_1 on which data is magnetically recorded. That is, disk 11_0 comprises the two recording surfaces 110_0 and 110_1. A lower surface and an upper surface of disk 11_1 provide recording surfaces 110_2 and 110_3 on which data is magnetically recorded. That is, disk 11_1 comprises the two recording surfaces 110_2 and 110_3. Disks 11_0 and 11_1 are rotated at high speed by the SPM 13. The SPM 13 is driven by, for example, a driving current supplied by an SVC 15.

Sliders 12_0 and 12_1 are arranged over the lower surface (recording surface 110_0) and the upper surface (recording surface 110_1), respectively, of disk 11_0. Sliders 12_2 and 12_3 are arranged in association with the lower surface (recording surface 110_2) and the upper surface (recording surface 110_3), respectively, of disk 11_1. Head element sections 120_0 to 120_3 are formed in sliders 12_0 to 12_3, respectively. Head element sections 120_0 to 120_3 are hereinafter simply referred to as heads 120_0 to 120_3. That is, sliders 12_0 to 12_3 comprise heads 120_0 to 120_3. Heads 120_0 to 120_3 comprise specific head numbers 0 to 3. Heads 120_0 to 120_3 (more specifically, a write element 121 and a read element 122 in each of heads 120_0 to 120_3) are used to write and read data to and from recording surfaces 110_0 to 110_3, respectively.

FIG. 2 is a schematic plan view and a schematic side view of a slider 12_$j$ flying over a recording surface 110_$j$ of a disk 11_$i$ ($i$=0 or 1) (for $i$=0, $j$=0 and for $i$=1, $j$=2 or 3). Head 120_$j$ of slider 12_$j$ includes a write element 121, a read element 122, and a heater element 123.

The write element 121 produces a magnetic field in response to a write current supplied by a preamplifier 16, thereby changing a magnetic pole at a corresponding position on recording surface 110_$j$ of disk 11_$i$. Thus, data corresponding to the write current is written to (recorded on) recording surface 110$j$ of disk 11_$i$. That is, the write element 121 is used to write data to recording surface 110$j$ of disk 11_$i$.

The read element 122 detects a magnetic field produced by the magnetic pole at the corresponding position on recording surface 110_$j$ of disk 11_$i$ and converts the detected magnetic field into an electrical signal. Thus, the read element 122 reads data recorded on recording surface 110_$j$ of disk 11_$i$. That is, the read element 122 is used to read data from recording surface 110_$j$ of disk 11_$i$. According to the embodiment, the read element 122 is a giant magnetoresistive (GMR) element and comprises a hard film (more specifically, a hard bias film).

If head 120_$j$ (particularly a surface of head 120_$j$ opposite to recording surface 110_$j$) contacts with a protrusion on recording surface 110_$j$, the characteristics of the write element 121 and the read element 122 may be degraded. According to the embodiment, the longitudinal (the longitudinal direction is hereinafter referred to as a first direction) width "a" of the entire read element 122 including the hard film is approximately equal to the width of head 120_$j$ in the first direction.

In this case, a concentric circular area on recording surface 110_$j$ of disk 11_$i$ in which the protrusion (defect) is present is referred to as a first concentric circular area. Furthermore, a concentric circular area on recording surface 110_$j$ which is tangential to an outer circumference of the first concentric circular area and which has the width "a" is referred to as a second concentric circular area. Additionally, a concentric circular area on recording surface 110_$j$ which is tangential to an inner circumference of the first concentric circular area and which has the width "a" is referred to as a third concentric circular area. According to the embodiment, a concentric circular area comprising the first to third concentric circular areas is used as a track skip area. The width of the second and third concentric circular areas may be set to be larger than the width "a".

The heater element 123 is, for example, a resistive heating element and produces heat when the preamplifier 16 supplies power (heater power) to the heater element 123. The supply of heater power to the heater element 123 is hereinafter referred to as turn-on of the heater element 123. Heat produced by the heater element 123 thermally deforms head 120_$j$ including the heater element 123 and thus projects head 120_$j$ toward recording surface 110_$j$ of disk 11_$i$. This regulates the distance (spacing) between head 120_$j$ and recording surface 110_$j$ of disk 11_$i$, that is, the flying height of head 120_$j$ (head flying height).

With reference back to FIG. 1, the configuration of the HDD will be described. The actuator 14 comprises, for example, three arms 141, 142, and 143. A slider 12_0 is attached to a tip of a suspension 144_0 extending from an arm 141 of the actuator 14. Sliders 12_1 and 12_2 are attached to tips of suspensions 144_1 and 144_2 extending from an arm 142 of the actuator 14. A slider 12_3 is attached to a tip of a suspension 144_3 extending from an arm 143 of the actuator 14.

The arms 141 to 143 of the actuator 14 are supported so as to be rotationally movable around a pivot 145. The actuator 14 comprises a voice coil motor (VCM) 146. The VCM 146 is a driving source for the actuator 14. The VCM 146 is driven in response to a driving current supplied by the SVC 15 and thus rotationally moves the arms 141 to 143 of the actuator 14 around the pivot 145 at the same time. That is, the VCM 146 moves the arms 141 to 143 in a radial direction of disks 11_0 and 11_1. Thus, sliders 12_0 to 12_3 are moved in the radial direction of disks 11_0 and 11_1 so as to draw an arc.

The HDD shown in FIG. 1 further includes a servo controller (SVC) 15, a preamplifier 16, a main controller 17, a flash read-only memory (FROM) 18, and a random access memory (RAM) 19. The SVC 15 drives the SPM 13 and the VCM 146 under the control of a main controller 17 (more specifically, a CPU 13 in the main controller 17). When the VCM 146 is driven by the SVC 15, head 120_$j$ is positioned at a target track on recording surface 110_$j$ of disk 11_$i$.

The preamplifier 16 amplifies a signal (read signal) read by the read element 122 (FIG. 2) in head 120_$j$. The preamplifier 16 further converts write data output by the main controller 17 (more specifically, an R/W channel 171 in the main controller 17) into a write current. The preamplifier 16 then outputs the write current to the write element 121 in head 120_$j$.

Furthermore, the preamplifier 16 turns the heater element 123 (FIG. 2) in head 120_$j$ on under the control of the main controller 17. That is, the preamplifier 16 supplies heater power to the heater element 123 in head 120_$j$. The SVC 15 may supply heater power to the heater element 123.

The preamplifier 16 is, for example, fixed to the actuator 14 at a predetermined position thereon and electrically connected to the main controller 17 via a flexible printed circuit board (FPC). However, in FIG. 1, the preamplifier 16 is disposed away from the actuator 14 for convenience of drawing.

Furthermore, in FIG. 1, the single preamplifier 16 is provided. However, the preamplifier 16 may be provided for each head 120_j.

The main controller 17 is implemented by, for example, a large scale integrated circuit (LSI) in which a plurality of elements is integrated on a single chip. The main controller 17 includes the read/write (R/W) channel 171, a hard disk controller (HDC) 172, and a CPU 173.

The R/W channel 171 processes signals for reading and writing. That is, the R/W channel 171 converts a read signal amplified by the preamplifier 16 into digital data and decodes read data from the digital data. The R/W channel 171 also extracts servo data from the digital data. The R/W channel 171 further encodes write data transferred by the HDC 172 via the CPU 173. The R/W channel 171 then transfers the encoded write data to the preamplifier 16.

For extracting servo data, the R/W channel 171 generally includes a variable gain amplifier (VGA) 171a, a filter 171b, and an automatic gain controller (AGC) 171c. The VGA 171a further amplifies the read signal amplified by the preamplifier 16 to set the signal to a given amplitude. The filter 171b is, for example, an analog filter used to remove noise contained in the read signal amplified by the VGA 171a. The AGC 171c controls the AGC 171a so as to maintain the read signal output by the VGA 171a at a given amplitude. That is, the AGC 171c varies the gain of the VGA 171a based on the amplitude of the read signal from which noise has been removed by the filter 171b. The read signal from which noise has been removed is converted into digital data by an analog-digital converter (not shown in the drawings).

The HDC 172 is connected to the host via the host interface 170. The HDC 172 functions as a host interface controller which receives a signal transferred by the host and which transfers a signal to the host. Specifically, the HDC 172 receives a command (a write command, a read command, or the like) transferred by the host and delivers the received command to the CPU 173. The HDC 172 further functions as disk interface controller that controls writing of data to recording surface 110_j of disk 11_i and reading of data from recording surface 110_j via the CPU 173, the R/W channel 171, the preamplifier 16, and head 120_j.

In response to an access request (a write request or a read request) from the host, the CPU 173 controls the SVC 15 and thus controls accesses to the disk 11 via the R/W channel 171, the preamplifier 16, and head 120_j. This control is performed in accordance with a control program. The CPU 173 also regulates, during a seek operation, the flying height of head 120_j so as to avoid the contact of head 120_j with the protrusion on recording surface 110_j of disk 11_i. For this adjustment, the CPU 173 controls the heater element 123 in head 120_j (for example, turn-on and -off of the heater element 123) via the preamplifier 16.

The FROM 18 is a rewritable nonvolatile memory. The control program is stored in the FROM 18. Alternatively, an initial program loader (IPL) may be stored in the FROM 18, with the control program stored in the disk 11. In this case, when the HDD is powered on, the CPU 173 may execute the IPL and thus load the control program from the disk 11 into the FROM 18 or the RAM 19. A track skip management table 181 and a wait time management table 182 are further stored in the FROM 18. The track skip management table 181 and the wait time management table 182 are loaded into the RAM 19 when the HDD 10 is powered on. The track skip management table 181 and the wait time management table 182 will be described below.

The track skip management table 181 and the wait time management table 182 may be stored in, for example, a system area of recording surface 110_j of disk 11_i. The system area is a storage area used by the system, that is, a storage area that is not recognized by a user. A storage area of recording surface 110_j of disk 11_i which can be used by the user is referred to as a user area. That is, the user area is a storage area that is recognized by the user. Furthermore, the track skip management table 181 and the wait time management table 182 may be stored both in the FROM 18 and in disk 11_i.

The RAM 19 is a volatile memory such as a dynamic RAM. A part of the storage area in the RAM 19 is used as an area into which the track skip management table 181 and the wait time management table 182 are loaded. Another part of the storage area in the RAM 19 is used as a work area for the CPU 173.

Now, a first method for regulating the flying height during a seek operation which method is applied in the embodiment will be described in comparison with two other methods for regulating the flying height (hereinafter referred to as a second method for regulating the flying height and a third method for regulating the flying height). FIG. 3A is a schematic diagram illustrating the first method for regulating the flying height. FIG. 3B is a schematic diagram illustrating the second method for regulating the flying height. FIG. 3C is a schematic diagram illustrating the third method for regulating the flying height.

First, with reference to FIG. 3B, the second method for regulating the flying height during a seek operation will be described. This case assumes a seek operation of moving head 120_j to a target track TT such that head 120_j traverses a track skip area 300 in the radial direction of disk 11_i. The track skip area 300 is a concentric circular area on recording surface 110_j of disk 11_i which area includes a protrusion 301. The protrusion 301 has a width "b" (more specifically, the radial width of disk 11_i) and is present between a track A3 and a track A4 on recording surface 110_j.

The track skip area 300 comprises a first concentric circular area between track A3 and track A4, a second concentric circular area between a track A1 and track A3, and a third concentric circular area between track A4 and a track A5. The first concentric circular area in the track skip area 300 has the width "b". Each of the second and third concentric circular areas in the track skip area 300 has the width "a", which corresponds to the longitudinal width of the entire head 120_j. That is, the track skip area 300 is a concentric circular area with a width b+2a.

Now, it is assumed that head 120_j is positioned at a track close to the track skip area 300, for example, a track (first track) A0. In this case, the heater element 123 in head 120_j is on, with head 120_j projecting toward recording surface 110_j of disk 11_i. Thus, head 120_j is set to a sufficiently small target flying height.

It is assumed that, in this state, a seek operation is performed to move head 120_j to the target track (second track) TT on recording surface 110_j. That is, head 120_j is assumed to be moved in a direction shown by arrow 304 in FIG. 3B so as to traverse the track skip area 300. In this case, according to the second method for regulating the flying height, the heater element 123 in head 120_j is turned off when the seek operation is started. Then, in this state, the seek operation is performed. Thus, head 120_j starts from track A0 and sequentially passes over track A1 and a track A2 and reaches track A3 (that is, one end of the protrusion 301).

The degree of projection of head 120_j gradually decreases in response to the turn-off of the heater element 123. Thus, when a certain time t[W] elapses from the point in time when the heater element 123 is turned off, head 120_j is positioned at a sufficiently increased flying height. However, in an example in FIG. 3B, head 120_j is close to the track skip area 300 at the point in time when the heater element 123 is turned off. In this case, head 120_j reaches the one end of the protrusion 301 before time t[W] elapses. At this time, the degree of projection of head 120_j fails to have sufficiently decreased, thereby preventing head 120_j from reaching a sufficient flying height. In this case, it is possible that head 120_j contacts (collides) with the protrusion 301 as shown in FIG. 3B. That is, when the second method for regulating the flying height is applied during a seek operation, if the seek operation is started at a position close to the track skip area 300, head 120_j is likely to contact with the protrusion 301.

Now, the third method for regulating the flying height during a seek operation will be described with reference to FIG. 3C. The third method for regulating the flying height uses a track skip area 310 instead of the track skip area 300. Compared to the track skip area 300, the track skip area 310 is extended by a width (c) both in an inner circumferential direction of disk 11_i and in an outer circumferential direction of disk 11_i. That is, a second concentric circular area in the track skip area 310 is a concentric circular area between a track B1 and track A3 and is wider than the track skip area 300 by the width (c). Similarly, a third concentric circular area in the track skip area 310 is a concentric circular area between track A4 and a track B3 and is wider than the third concentric circular area in the track skip area 300 by the width (c). Here, a time needed for head 120_j to traverse the concentric circular area with the width (c) on recording surface 110_j is denoted by tx. Time tx is assumed to be equal to time t[W].

Now, it is assumed that head 120_j is positioned at a track close to the track skip area 310, for example, a track B0. It is further assumed that, in this state, a seek operation is performed to move head 120_j to the target track TT on recording surface 110_j. That is, head 120_j is assumed to be moved in a direction shown by arrow 305 in FIG. 3C so as to traverse the track skip area 310. In this case, according to the third method for regulating the flying height, as with the second method for regulating the flying height, the heater element 123 in head 120_j is turned off when the seek operation is started. Then, in this state, the seek operation is performed.

According to the third method for regulating the flying height, head 120_j starts from track B0 and sequentially passes over track B1 and a track B2, and arrives over track A1 when time tx (that is, t[W]) elapses from the start of the seek operation. At this time, the degree of projection of head 120_j has sufficiently decreased, and thus, head 120_j has reached a sufficient flying height. In this case, a possible contact between head 120_j and the protrusion 301 is avoided. However, compared to the second method for regulating the flying height, the third method for regulating the flying height needs to extend the track skip area. This reduces the format efficiency of disk 11_i.

Thus, the embodiment applies the first method for regulating the flying height. The first method for regulating the flying height is a method for avoiding a possible contact between head 120_j and the protrusion without extending the track skip area 300 during the seek operation of moving head 120_j in the direction traversing the track skip area.

The first method for regulating the flying height during a seek operation will be described below with reference to FIG. 3A. Here, it is assumed that head 120_j is positioned at track A0, which is close to the track skip area 300, as is the case with FIG. 3B. It is further assumed that, in this state, a seek operation is performed to move head 120_j to the target track TT on recording surface 110_j. That is, head 120_j is assumed to be moved in a direction shown by arrow 303 in FIG. 3A so as to traverse the track skip area 310.

In this case, according to the first method for regulating the flying height, as with the second and third methods for regulating the flying height, the heater element 123 in head 120_j is turned off before the seek operation is started. However, according to the first method for regulating the flying height, the seek operation is not started when the heater element 123 is turned off. Specifically, the seek operation is not started until time (wait time) t[W] elapses with head 120_j positioned at track A0.

Then, during the wait time t[W], the degree of projection of head 120_j sufficiently decreases as shown by arrow 302 in FIG. 3A. That is, when the wait time t[W] elapses, head 120_j is positioned at a sufficiently increased flying height. This flying height (first flying height) is assumed to be larger than the height of the protrusion 301. In this state, the seek operation is started. That is, the seek operation is started at track A0 after the elapse of time t[W] from the point in time when the heater element 123 is turned off.

Thus, head 120_j starts from track A0 and sequentially passes over tracks A1 and A2, and arrives over track A3 (that is, the one end of the protrusion 301). At this time, head 120_j is positioned at a sufficiently increased flying height, thereby avoiding a possible contact between head 120_j and the protrusion 301. The seek operation is subsequently continued. Then, head 120_j sequentially passes over tracks A3, A4 and A5 and reaches the target track TT. That is, head 120_j reaches the target track TT by traversing the track skip area 300 without contacting with the protrusion 301. Then, the seek operation ends.

When the seek operation ends, the heater element 123 is turned on and supplies a predetermined heater power to the heater element 123. This increases the degree of projection of head 120_j. Then, head 120_j is lowered to a flying height that is suitable for writing of data to recording surface 110_j of disk 11_i and reading of data from recording surface 110_j of disk 11_i. Furthermore, when the seek operation ends, a tracking operation is performed. Thus, head 120_j is positioned at a target position in the target track TT and used to write data to the target track TT and to read data from the target track TT.

Heads 120_0 to 120_3 generally have different projection characteristics. Thus, to set the flying heights of heads 120_0 to 120_3 during data writing or reading to predetermined values, the heater power supplied to the heater elements 123 in heads 1200 to 120_3 is set to vary among heads 120_0 to 120_3. Furthermore, the flying heights of heads 120_0 to 120_3 depend on the radial positions of heads 120_0 to 120_3 over recording surfaces 110_0 to 110_3, respectively. Moreover, the flying heights of heads 120_0 to 120_3 depend on the temperature in an area around the actuator 14 including heads 120_0 to 120_3 (that is, the environmental temperature). Thus, the heater power supplied to the heater elements 123 in heads 120_0 to 120_3 also depends on the radial positions and environmental temperatures of heads 120_0 to 120_3.

Recording surface 110_j of disk 11_i corresponding to head 120_j is divided into a plurality of concentric circular areas commonly called zones. That is, recording surface 110_j comprises a plurality of zones. FIG. 4 shows an example of a disk format in which recording surface 110_j of disk 11_i comprises m+1 zones Z0, Z1, . . . , and Zm. Zones Z0, Z1, . . . , and Zm have respective zone numbers 0, 1, . . . , and m.

As described above, the heater power supplied to the heater element 123 in each head 120_j (j=0, 1, 2, or 3) varies depending on head 120_j, the radial position (that is, the zone), and the temperature. Therefore, the wait time t[W] also varies for each head 120_*j*, for each zone, and for each temperature. Thus, the embodiment uses the wait time management table 182 to manage wait time information W for each head 120_*j*, for each zone, and for each temperature. The wait time information W is numerical data (parameter) indicative of the wait time t[W].

FIG. 5 shows an example of a data structure in the wait time management table 182. As shown in FIG. 5, the wait time management table 182 holds the corresponding wait time information W for each of all combinations of three temperature ranges P, Q, and R, m+1 zone numbers 0, 1, . . . , and m (that is, zones Z0, Z1, . . . , and Zm), and four head numbers 0, 1, 2, and 3 (that is, heads 120-0, 120-1, 120-2, and 120-3). Here, the temperature range P is from a temperature Tpmin to a temperature Tpmax. The temperature range Q is from a temperature Tqmin to a temperature Tqmax. The temperature Tqmin is, for example, Tpmax+Δ. The temperature range R is from a temperature Trmin to a temperature Trmax. The temperature Trmin is, for example, Tqmax+Δ.

The embodiment determines the wait time t[W] for each of all the combinations of representative temperatures Tprep, Tqrep, and Trrep within the temperature ranges P, Q, and R, representative tracks TRK0rep, TRK1rep, . . . , and TRKmrep, and heads 120-0, 120-1, 120-2, and 120-3. Representative temperatures Tprep, Tqrep, and Trrep are, for example, intermediate temperatures within the temperature ranges P, Q, and R, that is, Tprep=(Tpmin+Tpmax)/2, Tqrep=(Tqmin+Tqmax)/2, and Trrep=(Trmin+Trmax)/2. However, representative temperatures Tprep, Tqrep, and Trrep may be, for example, lower limit temperatures or upper limit temperatures of the temperature ranges P, Q, and R. Representative tracks TPK0rep, TRK1rep, . . . , and TRKmrep are, for example, intermediate circumferential tracks in zones Z0, Z1, . . . , and Zm. However, representative tracks TPK0rep, TRK1rep, . . . , and TRKmrep may be other tracks in zones Z0, Z1, . . . , and Zm, for example, inner circumferential tracks or outer circumferential tracks.

Here, a representative temperature within a temperature range "g" (g=P, Q, or R) is denoted by Tgrep, and a representative track in a zone Zh (h=0, 1, . . . , or m) is denoted by TRKhrep. It is assumed that the wait time t[W] is determined for a combination of representative temperature Tgrep, representative track TRKhrep, and head 120_*j* (j=0, 1, 2, or 3). In this case, the determined wait time t[W] is used as the wait time t[W] corresponding to the combination of the temperature range "g", zone Zh (zone number "h"), and head 120_*j* (head number "j").

It is assumed that a seek operation of moving head 120_*j* to the target track TT is started. The environment temperature T of the actuator 14 at this point in time is assumed to belong to the temperature range "g". Track A0, at which head 120_*j* is positioned at this point in time, is assumed to belong to zone Zh. In this case, the CPU 173 refers to the wait time management table 182 and acquires the wait time information W recorded in the wait time management table 182 in association with the combination of the temperature range "g", the zone number "h", and the head number "j". The CPU 173 then uses the wait time t[W] indicated by the wait time information W acquired.

Here, two representative temperatures closer to an environmental temperature T are hereinafter referred to as a first representative temperature and a second representative temperature. Two temperature ranges to which the first and second representative temperatures belong are hereinafter referred to as a first temperature range and a second temperature range. In this case, the CPU 173 may execute linear interpolation based on two wait times corresponding to combinations of the first and second temperature ranges, the zone number "h", and the head number "j". Then, based on the linear interpolation, the CPU 173 may calculate a wait time corresponding to the environmental temperature T, the zone number (h), and the head number (j) and use the calculated wait time.

Now, a method for determining the wait time t[W] will be described. In general, a process of determining heater power is executed during steps of manufacturing such an HDD as shown in FIG. 1. The process of determining heater power is executed to determine the power to be supplied to the heater element in the head during reading and writing using the head. The process of determining heater power measures the distance between the head and the medium for each heater power in order to regulate the spacing between the head and the surface (recording surface) of the disk to a desired distance. Then, based on the result of the measurement, the heater power to be supplied to the heater element during reading and writing is determined.

The embodiment executes the process of determining the wait time after the process of determining heater power. The CPU 173 executes the process of determining the wait time in order to determine the wait time t[W] for each of all the combinations of representative temperatures Tprep, Tgrep, and Trrep within the temperature ranges P, Q, and R, representative tracks TRK0rep, TRK1rep, . . . , and TRKmrep in zones Z0, Z1, . . . , and Zm, and heads 120-0, 120-1, 120-2, and 120-3.

With reference to FIG. 6, a first process of determining the wait time which process is applied in the embodiment will be described taking, as an example, a case where the CPU 173 determines the wait time t[W] corresponding to a combination of representative temperature Tgrep, representative track TRKhrep, and head 120_*j*. Now, it is assumed that the heater element 123 in head 120_*j* is on and is supplied with heater power with a value determined in the process of determining heater power. Furthermore, head 120_*j* is assumed to be positioned at representative track TRKhrep. In this state, the CPU 173 turns off the heater element 123 in head 120_*j*. That is, the CPU 173 controls the preamplifier 16 and stops the supply of heater power from the preamplifier 16 to the heater element 123 in head 120_*j*.

Then, the degree of projection of head 120_*j* decreases over time. That is, the spacing between head 120_*j* and recording surface 110_*j* of disk 11_*i* increases over time. The increased spacing reduces the amplitude of a signal read from representative track TRKhrep by head 120_*j* (that is, a read signal). The read signal is amplified by the preamplifier 16, and the amplified signal is input to the VGA 171*a* in the R/W channel 171.

Each of the tracks on recording surface 110_*j* of disk 11_*i* comprises a plurality of discretely arranged servo sectors. Servo data (servo data signal) is recorded in each of the plurality of servo sectors. As is well known, the servo data includes a servo mark, address data, and servo burst data. The VGA 171*a* is operable during a period corresponding to each servo sector (what is called a period when the servo data signal is active). In this state, the VGA 171*a* further amplifies a read signal amplified by the preamplifier 16 (servo data signal) to set the signal to a given amplitude. That is, the VGA 171*a* further amplifies the read signal amplified by the preamplifier 16 using a gain indicated by the output level of the AGC 171*c*. The AGC 171*c* controls the gain of the VGA 171*a* according to the amplitude of the read signal so as to set the read signal amplified by the VGA 171*a* to the given amplitude.

When the heater element 123 in head 120_j is on, that is, when the heater element 123 is supplied with a predetermined heater power, the degree of projection of head 120_j projects is large. Thus, head 120_j is at a sufficiently small flying height. That is, the spacing between head 120_j and recording surface 110_j of disk 111 is sufficiently small. In this state, the signal read by the read element 122 in head 120_j (read signal) has a large amplitude. Consequently, the output level of the AGC 171c has a small, constant value.

On the other hand, when the heater element 123 in head 120_j is off, that is, when the supply of heater power to the heater element 123 is stopped, the degree of projection of head 120_j is small. Thus, head 120_j is at an increased flying height. In this state, the read signal has a reduced amplitude, and thus, the AGC 171c has an increased output level.

As is apparent from the above description, when the heater element 123 in head 120_j is turned off, the output level of the AGC 171c (that is, the gain of the VGA 171a) increases with the spacing as a result of turn-off of heater power. The CPU 173 starts monitoring the output level of the AGC 171c at the point in time of turn-off of heater power.

FIG. 6 also shows an example of the result of monitoring of the output level of the AGC 171. More specifically, FIG. 6 shows a relation between the output level of the AGC 171c and the elapsed time from the point in time of the turn-off of heater power (that is, the characteristic of a change in the output level of the AGC 171c). However, in FIG. 6, a sequence of servo sectors (servo sector numbers) is used as a parameter corresponding to time. That is, the time axis in FIG. 6 is indicative of a sequence of servo sectors over which head 120_j passes after the turn-off of heater power. For example, a servo sector 100 (a servo sector with a servo sector number of 100) shown in FIG. 6 is a servo sector over which head 120_j passes at the point in time when heater power is turned off.

In the example in FIG. 6, the output level of the AGC 171c is about 82 at the point in time when heater power is turned off. The output level of the AGC 171c starts to increase at the point in time when heater power is turned off, and continues to increase over time until the output level is saturated. This means that the flying height of head 120_j starts to increase at the point in time when heater power is turned off, and continues to increase over time until the flying height is saturated at a given value.

Here, the output level of the AGC 171c at the point in time of the turn-off of heater power (first output level) is denoted by A. The saturated output level of the AGC 171c is denoted by B. The CPU 173 detects the output levels A and B. Then, the CPU 173 calculates the difference Y between the output levels A and B (Y=B−A). The difference Y represents the maximum increase in the output level of the AGC 171c (the maximum increase from the level A). The CPU 173 then calculates a given fraction αY (0<α<1) of the difference Y. According to the embodiment, the CPU 173 uses a value close to 1, for example, 0.9 as α.

The CPU 173 detects a point in time (second point in time) when the output level of the AGC 171c has increased by 0.9Y compared to the output level obtained at the point in time (first point in time) when heater power is turned off. That is, the CPU 173 determines the time from the first point in time to the second point in time to be the wait time t[W]. According to the embodiment, in which α is 0.9, the determined wait time t[W] is the time needed for the output level of the AGC 171c to be approximately saturated. That is, the CPU 173 considers the time needed for the output level of the AGC 171c to increase by 0.9Y from A to be the time needed for the output level of the AGC 171c to be approximately saturated. The CPU 173 thus determines the time needed for the output level of the AGC 171c to increase by 0.9Y from A to be the wait time t[W].

However, α is not limited to 0.9. That is, the value of α may be selected such that the output level αY+A of the AGC 171 at the second point in time corresponds to the flying height of head 120_j needed to avoid a possible contact between head 120_j and the protrusion during a seek operation. In this case, the second point in time is the point in time when the head is estimated to have risen to the first flying height.

The CPU 173 executes the determination of the wait time t[W] for all the combinations of the temperature ranges P, Q, and R, zones Z0, Z1, . . . , and Zm, and heads 120-0, 120-1, 120-2, and 120-3. The CPU 173 then records the results of the determination of the wait time t[W] in the wait time management table 182.

Thus, in the wait time management table 182, the wait time information W associated with a combination of the temperature range "g" (g=P, Q, or R), the zone "h" (h=0, 1, . . . , or m), and head 120_j (j=0, 1, 2, or 3) is indicative of the wait time t[W] optimum for the combination. The optimum wait time t[W] refers to the minimum wait time needed to ensure the first flying height of head 120_j (which corresponds to a minimum flying height Xmin described below) needed to avoid a possible contact between head 120_j and the protrusion during a seek operation. Hence, the embodiment uses the wait time t[W] as described above and thus enables minimization of degradation of the performance of the HDD caused by a delay in the start of a seek operation.

The wait time t[W] need not necessarily be set for each temperature range, for each zone, and for each head. For example, the CPU 173 may determine the longest of the wait times t[W] corresponding to the respective first combinations of the temperature range "g", zone Zh, and heads 120_0 to 120_3 to be the wait time t[W] common to the first combinations. Similarly, the CPU 173 may determine the longest of the wait times t[W] corresponding to the respective second combinations of all the temperature ranges, all zones, and heads 120_0 to 120_3 to be the wait time t[W] common to the second combinations. This allows, in spite of degraded performance of the HDD, simplification of the structure of the wait time management table 182 and the determination of the wait time at the start of a seek operation.

The dependence of head 120_j on the radius and the temperature is generally estimated (or simulated) when the design of the HDD shown in FIG. 1 is evaluated. Thus, if such radius dependence and temperature dependence are utilized, the CPU 173 need not necessarily monitor the output level of the AGC 171 for each head 120_j for all the combinations of zones Z0, Z1, . . . , and Zm and the temperature ranges P, Q, and R.

Furthermore, a modification of the embodiment may apply, instead of the first process of determining the wait time, another process of determining the wait time (hereinafter referred to as a second method for determining the wait time). The second method for determining the wait time will be described with reference to FIG. 7. As with FIG. 6, FIG. 7 also shows an example of the results of monitoring of the output level of the AGC 171.

As is the case with the second process of determining the wait time, the CPU 173 detects the output levels A and B of the AGC 171c and calculates the difference Y between the output levels A and B (Y=B−A). Here, the flying height of head 120_j in the heater power off state is denoted by X. The flying height X is measured in the process of determining the heater power. Furthermore, the minimum flying height to be ensured during a seek operation (minimum flying height) is denoted by Xmin. Based on X, Y, and Xmin, the CPU 173 calculates the increase in output level of the AGC 171 needed to ensure the minimum flying height Xmin (more specifically, the increase from the level A obtained at the point in time when heater power is turned off) as a threshold TH in accordance with:

$$TH=(Y/X)*X\text{min}$$

Here, the symbol * denotes a multiplication.

The CPU 173 detects the point in time when the output level of the AGC 171 has increased by TH (second point in time) compared to the output level obtained at the point in time when heater power is turned off (first point in time). The second point in time is the point in time when head 120_*j* is estimated to have risen to the minimum flying height (first flying height). The CPU 173 determines the time from the first point in time to the second point in time to be the wait time t[W]. That is, the CPU 173 determines the time needed for the output level of the AGC 171*c* to increase by TH from A to be the wait time t[W] as shown in FIG. 7. In addition, (Y/X)*Xmin+A may be used as the threshold TH. In this case, the CPU 173 may determine the time needed for the output level of the AGC 171*c* to increase from A to TH to be the wait time t[W].

Figure 8:
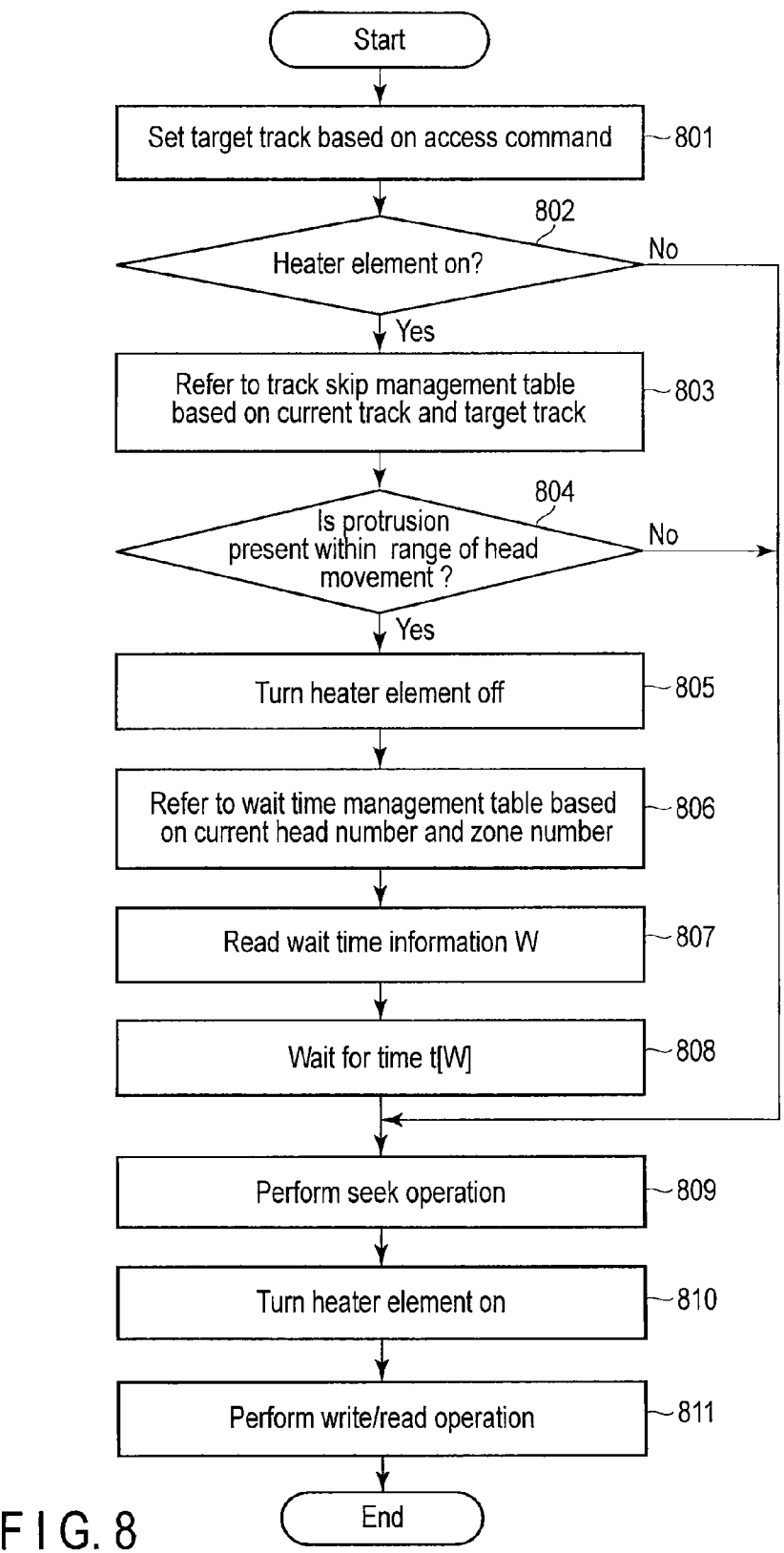
FIG. 8 is a flowchart showing a procedure for executing an access command which procedure is applied in the embodiment.

Now, with reference to FIG. 3A and FIG. 8, operation of the embodiment which utilizes the first method for regulating the flying height during a seek operation will be described taking, as an example, a case where an access command issued by the host is executed. FIG. 8 is a flowchart showing a procedure for executing the access command.

Now, it is assumed that the CPU 173 receives the access command issued by the host from the HDC 172. The access command is a write/read command (a write command or a read command) specifying writing or reading of data. The CPU 173 sets a target track to be accessed based on the access command received from the HDC 172 (block 801). The target track is assumed to be the target track TT on recording surface 110_*j* of disk 111 shown in FIG. 3A. In this case, the target track TT is identified by the head number "j" of head 120_*j* corresponding to recording surface 110_*j* and a cylinder number cyl of the target track TT. That is, the CPU 173 sets the target track TT by setting the head number "j" and the cylinder number cyl. Furthermore, recording surface 110_*j* of disk 11_*i* is assumed to be recording surface 110_0 (first recording surface) of disk 11_0 (first disk). Head 120_*j* is assumed to be head 120_0 (first head) (i=0 and j=0).

Then, the CPU 173 determines whether the heater element 123 in head 120_*j* is on (block 802). If the heater element 123 is on (Yes in block 802), the CPU 173 refers to the track skip management table 181 based on the current track (first track) and the target track (second track) TT (block 803). The current track refers to the track at which head 120_*j* is currently positioned. In this case, the current track is track A0 (FIG. 3A). Then, the CPU 173 determines whether any protrusion is present within a range from the current track A0 to the target track TT (that is, the range of head movement) in which head 120_*j* is to be moved (block 804). For this determination, the CPU 173 determines whether the track skip area recorded in the track skip management table 181 is present within the range of head movement. If the track skip area is not present within the range of head movement, the CPU 173 determines that a protrusion is present within the range of head movement (Yes in block 804). In contrast, if the track skip area is present within the range of head movement, the CPU 173 determines that no protrusion is present within the range of head movement (No in block 804).

Here, it is assumed that the protrusion 301 (more specifically, the track skip area 300 including the protrusion 301) is present within the range of head movement (Yes in block 804) as shown in the example in FIG. 3A. In this case, the heater element 123 in head 120_*j* is on, and thus, head 120_*j* is at a small flying height. Consequently, if, in this state, a seek operation of moving head 120_*j* from the current track A0 to the target track TT is performed, head 120_*j* is likely to contact with the protrusion 301.

Thus, the CPU 173 turns the heater element 123 in head 120_*j* off (block 805). That is, the CPU 173 controls the preamplifier 16 to stop the supply of heater power to the heater element 123. The CPU 173 then refers to the wait time management table 182 based on the current head number and the current zone number (block 806). More specifically, the CPU 173 refers to the wait time management table 182 based on the current head number, the current zone number, and the current temperature range. In this case, the current head number is the head number of head 120_*j* (that is, (j)). The current zone number is the zone number of the zone to which the current track A0 belongs. Furthermore, the current temperature range is the temperature range to which the current environmental temperature around the actuator 14 belongs. However, for simplification, it is hereinafter assumed that the wait time information W recorded in the wait time management table 182 is associated with the head number and the zone number.

The CPU 173 reads the wait time information W associated with the current head number and the current zone number from the wait time management table 182 (block 807). The CPU 173 waits for the wait time t[W] indicated by the read wait time information (block 808). That is, with head 120_*j* positioned at track A0, the CPU 173 waits for time t[W] to elapse. At this time, the heater element 123 in head 120_*j* is off. Thus, when time t[W] elapses, the degree of projection of the heater element 123 is sufficiently reduced, and head 120_*j* is consequently positioned at a sufficiently increased flying height (FIG. 3A).

Thus, the CPU 173 waits for time t[W] (block 808) and then starts a seek operation of moving head 120_*j* from the current track A0 to the target track TT (block 809). At the point in time when the seek operation is started, head 120_*j* is at a sufficiently large flying height. Hence, even with the protrusion 301 present between the current track A0 and the target track TT, head 120_*j* can avoid contacting with the protrusion 301 during the seek operation.

It is assumed that the seek operation has allowed head 120_*j* to move to the target track TT across the track skip area 300 including the protrusion 301. Then, the CPU 173 ends the seek operation and turns the heater element 123 in head 120_*j* on (block 810). Furthermore, upon ending the seek operation, the CPU 173 performs a tracking operation of positioning head 120_*j* at the target position in the target track TT. Then, with head 120_*j* positioned at the target position in the target track TT, the CPU 173 performs a write/read operation (block 811). That is, the CPU 173 performs a write operation of writing data to the target track TT using head 120_*j* or a read operation of reading data from the target track TT using head 120_*j*.

A seek operation involving a wait time as described above is also performed when the CPU 173 receives a seek command from the host via the HDC 172. As is well-known, the seek command instructs moving head 120_*j* from the current track to the target track. A seek operation involving a wait time as described above is also performed when the CPU 173 itself issues a seek command for stepping, for patrolling, head 120_*j* one track at a time so that head 120_*j* can circumvent the track skip area.

The above-described operation in accordance with the flowchart in FIG. 8 is similarly performed when recording surface 110_*j* of disk 11_*i* on which the target track TT is present is other than recording surface 110_0 of disk 11_0 (the first recording surface of the first disk). That is, the above-described operation in accordance with the flowchart in FIG. 8 is similarly performed when head 120_*j* to be moved to the target track TT is other than head 120_0 (first head). Recording surface 110_*j* other than recording surface 110_0 (the first recording surface of the first disk) is recording surface 110_1 of disk 11_0, recording surface 110_2 of disk 11_1, or recording surface 110_3 of disk 11_1 (the second recording surface of the first disk or the second disk). Head 120*j* other than head 120_0 (first head) is head 120_1, 120_2, or 120_3 (second head).

According to the embodiment, the heater element 123 is turned off before the seek operation is started. That is, the supply of heater power to the heater element 123 is stopped. However, the value of heater power supplied to the heater element 123 may be reduced from a first value to a second value instead of turning off the heater element 123. However, the second value needs to be sufficiently smaller than the first value to the degree that head 120_*j* can be positioned at a flying height of at least Xmin. The embodiment corresponds to a case where the second value is zero.

Furthermore, according to the embodiment, the heater element 123 is off during the seek operation. That is, the value of heater power is reduced during the seek operation. However, the heater element 123 may be turned off when head 120_*j* is moved from the current track to one end of the track skip area 300. Then, the movement of head 120_*j* may be stopped for the wait time t[W] and then resumed. Moreover, the heater element 123 may be turned on at a point in time when head 120_*j* passes over the track skip area 300.

Furthermore, the HOD comprises the two disks 11_0 and 11_1. However, the HDD may comprise a single disk. Additionally, according to the embodiment, the two sliders are associated with the lower surface and upper surface, respectively, of disk 11_*i* (i=0 or 1). However, the single slider may be associated with one of the surfaces of disk 11_*i*.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk storage apparatus, comprising:
a first slider configured to fly over a first recording surface of a first disk and comprising a first head comprising a write element, a read element, and a heater element, the heater element being configured to project the first head toward the first recording surface of the first disk by thermally deforming the first head depending on heater power supplied to the heater element;
a controller configured to reduce a value for the heater power before performing a seek operation of moving the first head from a first track to a second track such that the first head moves across a concentric circular area including a protrusion on the first recording surface, and to start the seek operation after a wait time, needed for a flying height of the first head to increase to a first flying height in response to the reduction in the heater power, elapses;
a variable gain amplifier configured to amplify a read signal read from the first recording surface by the first head, by a set gain; and
an automatic gain controller configured to set the gain of the variable gain amplifier so that the read signal amplified by the variable gain amplifier has a given amplitude, wherein, the controller is further configured to:
reduce, in order to determine the wait time, the value of the heater power from a first value to a second value at a first point in time;
monitor an output level of the automatic gain controller from the first point in time; and
determine the wait time based on a result of monitoring of the output level of the automatic gain controller.

2. The disk storage apparatus of claim 1, wherein the controller is configured to:
detect a second point in time when the flying height of the first head is estimated to have increased to the first flying height based on a change in the output level of the automatic gain controller; and
determine a time from the first point in time to the second point in time to be the wait time.

3. The disk storage apparatus of claim 2, wherein the controller is configured to:
monitor the output level of the automatic gain controller until the output level of the automatic gain controller is saturated; and
detect, as the second point in time, a point in time when the output level of the automatic gain controller increases from a first output level by a first ratio of a difference between a second output level and the first output level, the second output level being a saturated output level of the automatic gain controller and the first output level being an output level of the automatic gain controller obtained at the first point in time.

4. The disk storage apparatus of claim 2, wherein the controller is configured to:
monitor the output level of the automatic gain controller until the output level of the automatic gain controller is saturated; and
detect, as the second point in time, a point in time when the output level of the automatic gain controller increases by (Y/X)*Xmin from a first output level where a difference between a second output level and the first output level is denoted by Y, the flying height of the first head obtained when the value of the heater power is the second value is denoted by X, and the first flying height is denoted by Xmin, the second output level being a saturated output level of the automatic gain controller and the first output level being an output level of the automatic gain controller obtained at the first point in time.

5. The disk storage apparatus of claim 1, wherein the wait time is indicated by wait time information stored in a first area in a nonvolatile memory or the disk.

6. The disk storage apparatus of claim 5, further comprising:
a second slider configured to fly over a second recording surface of the first disk or a second disk, the second slider comprising a second head comprising a write element, a read element, and a heater element, the heater element in the second head being configured to project the second head toward the second recording surface of the first disk or the second disk by thermally deforming the second head depending on heater power supplied to the heater element in the second head,
wherein:
the wait time information stored in the first area is indicative of a wait time for each of the first head and the second head; and
the controller is configured to measure a wait time corresponding to a head to be moved during a seek operation.

7. The disk storage apparatus of claim 5, further comprising:
a second slider configured to fly over a second recording surface of the first disk or a second disk, the second slider comprising a second head comprising a write element, a read element, and a heater element, the heater element in the second head being configured to project the second head toward the second recording surface of the first disk or the second disk by thermally deforming the second head depending on heater power supplied to the heater element in the second head,
wherein:
each of the first recording surface and the second recording surface comprises a plurality of concentric circular zones;
the wait time information stored in the first area is indicative of a wait time for each of the first head and the second head and for each of the plurality of zones; and
the controller is configured to measure a wait time corresponding to a combination of a head to be moved during a seek operation and a zone including a track at which the head is positioned at a point in time when the seek operation is started.

8. A method, implemented in a controller of a disk storage apparatus, for regulating a head flying height before a seek operation, the disk storage apparatus comprising a first slider, the controller, a variable gain amplifier, and an automatic gain controller, the first slider being configured to fly over a first recording surface of a first disk and comprising a first head comprising a write element, a read element, and a heater element, the heater element being configured to project the first head toward the first recording surface of the first disk by thermally deforming the first head depending on heater power supplied to the heater element, the variable gain amplifier being configured to amplify a read signal read from the first recording surface by the first head, by a set gain, the automatic gain controller being configured to set the gain of the variable gain amplifier so that the read signal amplified by the variable gain amplifier has a given amplitude, the method comprising:
reducing a value for the heater power before performing a seek operation of moving the first head from a first track to a second track in such a manner that the first head moves across a concentric circular area on the first recording surface which includes a protrusion;
starting the seek operation after a wait time, needed for a flying height of the first head to increase to a first flying height in response to the reduction in the heater power, elapses;
reducing, in order to determine the wait time, the value of the heater power from a first value to a second value at a first point in time;
monitoring an output level of the automatic gain controller from the first point in time; and
determining the wait time based on a result of monitoring of the output level of the automatic gain controller.

9. The method of claim 8, further comprising:
detecting a second point in time when the flying height of the first head is estimated to have increased to the first flying height based on a change in the output level of the automatic gain controller; and
determining a time from the first point in time to the second point in time to be the wait time.

10. The method of claim 9, further comprising:
monitoring the output level of the automatic gain controller until the output level of the automatic gain controller is saturated; and
detecting, as the second point in time, a point in time when the output level of the automatic gain controller increases from a first output level by a first ratio of a difference between a second output level and the first output level, the second output level being a saturated output level of the automatic gain controller and the first output level being an output level of the automatic gain controller obtained at the first point in time.

11. The method of claim 9, further comprising:
monitoring the output level of the automatic gain controller until the output level of the automatic gain controller is saturated; and
detecting, as the second point in time, a point in time when the output level of the automatic gain controller increases by $(Y/X)*Xmin$ from a first output level where a difference between a second output level and the first output level is denoted by Y, the flying height of the first head obtained when the value of the heater power is the second value is denoted by X, and the first flying height is denoted by Xmin, the second output level being a saturated output level of the automatic gain controller and the first output level being an output level of the automatic gain controller obtained at the first point in time.

12. The method of claim 8, wherein the wait time is indicated by wait time information stored in a first area in a nonvolatile memory or the disk.

13. The method of claim 12, wherein:
the disk storage apparatus further comprises a second slider configured to fly over a second recording surface of the first disk or a second disk, the second slider comprising a second head comprising a write element, a read element, and a heater element, the heater element in the second head being configured to project the second head toward the second recording surface of the first disk or the second disk by thermally deforming the second head depending on heater power supplied to the heater element in the second head,
the wait time information stored in the first area is indicative of a wait time for each of the first head and the second head; and
the method further comprises measuring a wait time corresponding to a head to be moved during a seek operation.

14. The method of claim 12, wherein:
the disk storage apparatus further comprises a second slider configured to fly over a second recording surface of the first disk or a second disk, the second slider comprising a second head comprising a write element, a read element, and a heater element, the heater element in the second head being configured to project the second head toward the second recording surface of the first disk or the second disk by thermally deforming the second head depending on heater power supplied to the heater element in the second head;

each of the first recording surface and the second recording surface comprises a plurality of concentric circular zones;

the wait time information stored in the first area is indicative of a wait time for each of the first head and the second head and for each of the plurality of zones; and the method further comprises measuring a wait time corresponding to a combination of a head to be moved during a seek operation and a zone including a track at which the head is positioned at a point in time when the seek operation is started.

\* \* \* \* \*